(12) United States Patent
Ghali et al.

(10) Patent No.: US 7,036,097 B1
(45) Date of Patent: Apr. 25, 2006

(54) METHOD FOR DESIGNING A CASCADE OF DIGITAL FILTERS FOR USE IN CONTROLING AN ELECTROLYSIS CELL

(75) Inventors: Skander El Ghali, Jonquière (CA); Louis Guimond, Chicoutimi (CA); Renaud Santerre, Chicoutimi (CA)

(73) Assignee: Alcan International Limited, Montreal (CA)

( * ) Notice: Subject to any disclaimer, the term of this patent is extended or adjusted under 35 U.S.C. 154(b) by 0 days.

(21) Appl. No.: 10/999,350

(22) Filed: Nov. 30, 2004

(51) Int. Cl.
*G06F 17/50* (2006.01)

(52) U.S. Cl. ............................ 716/1; 716/6; 716/18

(58) Field of Classification Search ............. 716/1–2, 716/6, 18; 205/513
See application file for complete search history.

(56) References Cited

U.S. PATENT DOCUMENTS

| | | | |
|---|---|---|---|
| 4,766,552 A | 8/1988 | Aalbu et al. | 364/500 |
| 4,814,050 A | 3/1989 | McGraw et al. | 204/67 |
| 5,089,093 A | 2/1992 | Blatch et al. | 204/67 |
| 6,126,809 A | 10/2000 | Larsen | 205/336 |
| 6,132,571 A | 10/2000 | Bell | 204/243.1 |
| 2004/0044970 A1* | 3/2004 | Anderson et al. | 716/1 |

\* cited by examiner

*Primary Examiner*—Paul Dinh
(74) *Attorney, Agent, or Firm*—Cooper & Dunham LLP

(57) ABSTRACT

A method for designing a cascade of digital filters for use in the control of an electrolytic reduction cell by specifying the frequency and time response characteristics of the transfer function of the cascade of digital filters. The digital filters are exponential filters. The number of smoothing functions (i.e filters), each having different filter parameter values, is determined according to desired performance characteristics in the frequency and the time domains. These characteristics include: smoothing quality (specifiable in terms of passband, stopband and transition band of the filter frequency response profiles), group delay, and stabilization time. The use of the cascade of digital filters to control a reduction cell. A system for controlling a reduction cell comprising the cascade of digital filters. A process for electrolytic reduction of alumina comprising a step of filtering measurements of an electrical parameter using the cascade of digital filters.

19 Claims, 2 Drawing Sheets

METHOD FOR DESIGNING A CASCADE OF DIGITAL FILTERS FOR USE IN CONTROLING AN ELECTROLYSIS CELL

FIELD OF INVENTION

The present invention relates to the field of controlling the alumina feed to an electrolytic reduction cell. In particular, to a method for designing a cascade of digital filters for use in controlling an electrolytic reduction cell.

BACKGROUND

The electrolytic reduction of alumina is normally carried out in a Hall-Heroult cell which comprises an elongated, shallow vessel lined with a conductor material, such as carbon, forming a cathode. The vessel holds a molten electrolyte, typically cryolite, containing a low concentration of dissolved alumina, and a number of carbon anodes dipped into the electrolyte from above. When a direct current is passed through the cell, molten aluminum is formed and descends to the bottom of the cell where it forms a pool acting as part of the cell cathode.

As electrolysis proceeds, the concentration of alumina in the electrolyte falls and more alumina is added periodically. When the concentration in these regions falls to about 2% by weight or less, the so-called "anode effect" is observed. This manifests itself as a high voltage and the appearance of fluorocarbons in the anode gases. The anode effect is disadvantage for a number of well known reasons and attempts are made to avoid and/or terminate the anode effect.

It would be highly desirable to be able to directly measure the alumina content of electrolysis cells. It is known to remove a sample from the electrolysis cell and analyze it for alumina content, but this is too slow to be commercially practical. Thus, most industrial processes have resorted to indirect evaluation of the alumina content by following an electrical parameter representative of the alumina concentration of the electrolyte. This parameter is generally a variation of the resistance at the cell electrode terminals such as a resistance trend (a.k.a. R-trend) indicator. The curve of the variation of resistance as a function of alumina content can be plotted by calibration and the alumina concentration can thereby be known. However, the measured resistance can be affected by factors other than the alumina concentration such as for example environmental (e.g. electrical) interference, perturbation generating phenomena, and other sources of noise which can be difficult to control or eliminate.

Digital filters are used in a wide range of domains for signal processing and conditioning. In particular a cascade of multiple filters, such as Kalman filters, can be used for smoothing of a signal to remove or minimize the noise content in a measured signal. The individual filter parameters can be chosen, for example, based on observations made in the time domain.

Digital filters have been used in the control of reduction cells to mitigate the impact of extraneous factors, such as those described above, on the resistance trend indicator. As the selection of filter parameters has typically been based on observations in the time domain, the impact of the filters in terms of attenuation as a function of frequency and other related performance characteristic is not generally known in these applications. Therefore, it has not been possible to predict the performance of the filters in the face of different phenomena (e.g. bubble noise, metal waves) that can occur in the reduction cell and affect measurement signals.

What is needed is a method for designing a cascade of digital filters for use in controlling an electrolytic reduction cell that permits the performance characteristic (e.g. frequency response, stabilization time, group delay) of the cascade of filters to be adapted in light of knowledge of various types of phenomena that can occur in the cell.

SUMMARY OF INVENTION

A method for designing a cascade of digital filters for use in the control of an electrolytic reduction cell by specifying the frequency and time response characteristics of the transfer function of the cascade of digital filters. The digital filters are exponential filters. The number of smoothing functions (i.e filters), each having different filter parameter values, is determined according to desired performance characteristics in the frequency and the time domains. These characteristics include: smoothing quality (specifiable in terms of passband, stopband and transition band of the filter frequency response profiles), group delay (to be minimized), and stabilization time (less than or equal a pre-determined value). The use of the cascade of digital filters to control a reduction cell. A system for controlling a reduction cell comprising the cascade of digital filters. A process for electrolytic reduction of alumina comprising a step of filtering measurements of an electrical parameter using the cascade of digital filters.

In accordance with one aspect of the present invention, a method for designing a cascade of digital filters for use in controlling an electrolytic reduction cell, the cascade having a filter order corresponding to a number of digital filters in the cascade and each digital filter having a specifying parameter, the method comprising the steps of: selecting a lowest value for the parameter for each digital filter such that each of a group delay and a settling time are within predetermined performance characteristics; determining if a smoothing quality of the cascade of digital filters is within predetermined performance characteristics; increasing the filter order by one when the smoothing quality is not within predetermined performance characteristics; determining if a result of a time domain analysis is within predetermined performance characteristics; and increasing the filter order by one when the result of the time domain analysis is not within predetermined performance characteristics; wherein the filter order and the parameters for each of the digital filters is used to specify the cascade of digital filters to be used in controlling the electrolytic reduction cell.

In accordance with another aspect of the present invention, a method for designing a cascade of digital filters for use in controlling an electrolytic reduction cell, the cascade having a filter order corresponding to a number of digital filters in the cascade and each digital filter having a specifying parameter, the method comprising the steps of: setting the filter order to one; determining a group delay and a settling time as functions of parameter values for a predetermined sampling time; selecting a lowest value for the parameter for each digital filter such that each of the group delay and the settling time are within predetermined performance characteristics based on the group delay and the settling time as functions of parameter values; performing a frequency domain analysis for the cascade of digital filters; determining if a smoothing quality of the cascade of digital filters is within predetermined performance characteristics based on the frequency domain analysis; increasing the filter order by one when the smoothing quality is not within predetermined performance characteristics; performing a time domain analysis for the cascade of digital filters; determining if a result of the time domain analysis is within predetermined performance characteristics; and increasing the filter order by one when the result of the time domain analysis is not within predetermined performance characteristics; wherein the filter order and the parameters for each of the digital filters is used to specify the cascade of digital filters to be used in controlling the electrolytic reduction cell.

In accordance with still another aspect of the present invention, use of a cascade of digital filters designed according to the above described the method to control an electrolytic reduction cell.

In accordance with yet another aspect of the present invention, a process for electrolytic reduction of alumina in a reduction cell, the process comprising the steps of: introducing alumina into an electrolyte contained in the reduction cell; applying an electric current between an anode and a cathode in the reduction cell; measuring an electrical parameter representative of the alumina concentration in the reduction cell; filtering measurements of the electrical parameter using a cascade of digital filters, the cascade having a filter, order corresponding to a number of digital filters in the cascade and each digital filter having a specifying parameter, the filter order and the specifying parameters being determined by the steps of: selecting a lowest value for the parameter for each digital filter such that each of a group delay and a settling time are within predetermined performance characteristics; determining if a smoothing quality of the cascade of digital filters is within predetermined performance characteristics; increasing the filter order by one when the smoothing quality is not within predetermined performance characteristics; determining if a result of a time domain analysis is within predetermined performance characteristics; and increasing the filter order by one when the result of the time domain analysis is not within predetermined performance characteristics; predicting the onset of an anode effect based on filtered measurements of the electrical parameter; and adding additional alumina into the electrolyte when the onset of an anode effect is predicted.

In accordance with yet still another aspect of the present invention, a system for controlling an electrolytic reduction cell comprising: a mechanism for measuring an electrical parameter representative of an alumina concentration in the reduction cell; a cascade of digital filters for filtering measurements of the electrical parameter, the cascade having a filter order corresponding to a number of digital filters in the cascade and each digital filter having a specifying parameter, the filter order and the specifying parameters being determined by: selecting a lowest value for the parameter for each digital filter such that each of a group delay and a settling time are within predetermined performance characteristics; determining if a smoothing quality of the cascade of digital filters is within predetermined performance characteristics; increasing the filter order by one when the smoothing quality is not within predetermined performance characteristics; determining if a result of a time domain analysis is within predetermined performance characteristics; and increasing the filter order by one when the result of the time domain analysis is not within predetermined performance characteristics; a mechanism for predicting the onset of an anode effect based on filtered measurements of the electrical parameter; and a mechanism for adding alumina into the reduction cell when the onset of an anode effect is predicted.

Other aspects and features of the present invention will become apparent to those ordinarily skilled in the art to which it pertains upon review of the following description of specific embodiments of the invention in conjunction with the accompanying figures.

BRIEF DESCRIPTION OF DRAWINGS

The present invention will be described in conjunction with the drawings in which.

DETAILED DESCRIPTION

The present invention is directed to a method for designing a cascade of digital filters for use in the control of an electrolytic reduction cell by specifying the frequency and time response characteristics of the transfer function of the digital filters. The digital fiters are exponential filters arranged in a cascade.

Figure 1:
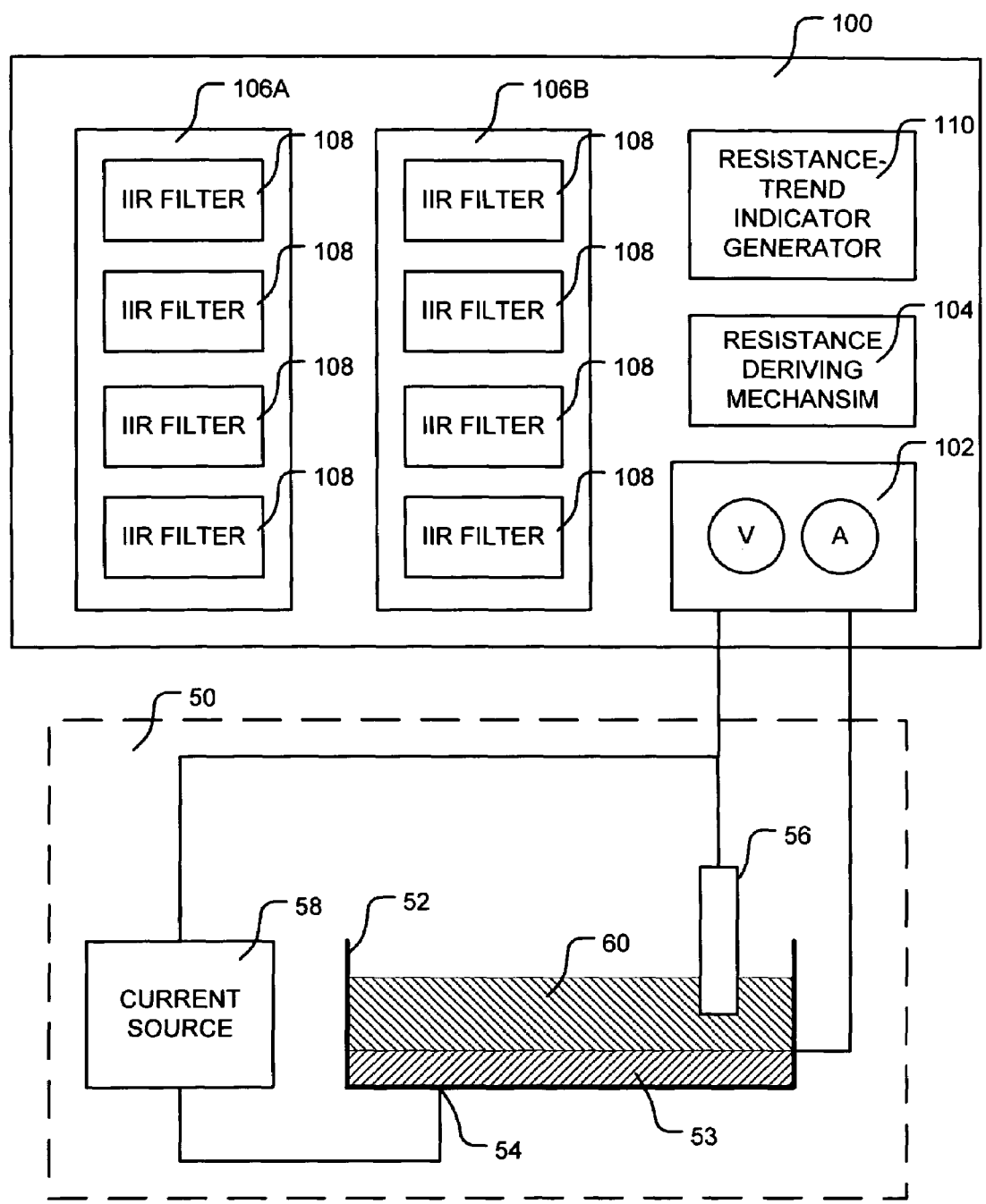
FIG. 1 is a schematic representation of an exemplary embodiment of an apparatus for generating a resistance-trend indicator together with an exemplary cathode cell with which the apparatus can be used.

FIG. 1 is a schematic representation of an exemplary apparatus 100 for generating indicators of alumina content together with an exemplary cathode cell 50 with which the apparatus 100 can be used. The cell 50 comprises a vessel 52, an anode 56 and a current source 58. The vessel 52 contains an electrolyte 60 into which alumina is introduced for electrolytic reduction thereby forming a layer of molten aluminum 53 at the bottom of the vessel 52 that acts as a cathode 54. The current source 58 is connected to the anode 56 and to the cathode 54.

The apparatus 100 comprises a measuring mechanism 102, a resistance deriving mechanism 104, a first and a second smoothing filters 106A, 106B and a resistance-trend indicator generator 110. The measuring mechanism 102 is connected to the cell 50 so as to permit the measurement of cell 50 voltage and current. The measurement of voltage and current can be made continuously or periodically while remaining within the scope of the present invention. The measuring mechanism 102 can also comprise pre-filters in the form of analogue, digital and combinations thereof filters for removing high frequency noise from the measurements. The resistance deriving mechanism 104 periodically derives a raw resistance value from the voltage and current measurements made by the measuring mechanism 102. The raw resistance is also referred to as a pseudo-resistance. The raw resistance value is represented as a digital value. Raw resistance values successively derived by the resistance deriving mechanism 104 are processes through each of the first and second smoothing filters 106A, 106B. Each smoothing filter 106A, 106B generates a filtered resistance. Each smoothing filter 106A, 106B is a digital filter that comprises a cascade of lowpass Infinite Impulse Response (IIR) filters 108. The illustrated embodiment has four IIR filters 108. A different number of IIR filters 108 can be used in order to achieve the desired smoothing function. Each of the IIR filters 108 provides an exponential filter function (i.e. characteristic). Each of the first and second smoothing filters 106A, 106B can have a different number of IIR filters 108 and each corresponding IIR filter 108 can have different filter parameters. Each of the smoothing filters 106A and 106B provides a lowpass filter function as a result of the convolution of the filter functions of the IIR filters 108 contained therein.

A series of smoothed resistance values generated by the second smoothing filter 106B, in response to the successively derived raw resistance values, are received by the resistance-trend indicator generator 110. The resistance-trend indicator generator 110 stores the smoothed resistance values and can represent a time series of the values as a resistance-trend indicator (i.e. as a time function). The filtered resistance generated by the first smoothing filter together with the resistance-trend indicator can be used to provide an indicator of the alumina concentration in the cell 50 when used in conjunction with known calibration methods.

The raw resistance, derived from voltage and current measurements for a given sampling period, is smoothed (i.e. filtered) using the smoothing filters 106A, 106B each comprising a number of simple exponential smoothing functions (i.e. the IIR filters 108) in cascade. The filtered resistance value resulting from a first smoothing function (IIR filter 108) is used as the input to a second simple exponential filter (IIR filter 108) and so on. The number of smoothing functions (i.e IIR filters 108), each having different filter parameter values, is determined according to desired performance characteristics. These characteristics include: smoothing quality (expressable in terms of passband, stopband and transition band of the filter frequency response profiles), group delay (to be minimized), and stabilization time (less than or equal a pre-determined value). Smoothing of the filtered resistance provides for the removal of unwanted low frequency noise resulting from phenomena such as, for example, metal waves, anode spikes carbon lumps and other similar phenomena. The frequencies and harmonics of noise from such phenomena are generally cell technology specific and well known.

The function, in the time domain, for a simple exponential filter, such as IIR filter 108, is described in time domain as follows:

$$R_f(t) = \alpha * R_{raw}(t) + (1-\alpha) * R_f(t - k\Delta t) \quad \text{EQ 1}$$

Similarly, the transfer function, in the Z-domain, is described as follows:

$$R_f(z) = \frac{\alpha}{1 - (1-\alpha)z^{-k}} * R_{raw}(z) \quad \text{EQ 2}$$

Where $R_f(t)$ = the filtered resistance in discrete time
$R_f(z)$ = the z-transform of $R_f(t)$
$R_{raw}$ = the raw resistance
$\alpha$ = filter parameter ($0 < \alpha \leq 1$)
$\Delta t$ = the sampling period
$t$ = continuous time $(0, \infty)$
$k$ = the number of a sampling time (i.e. the $k^{th}$ sample)
$z$ = the complex z-domain argument In the case of multiple simple exponential filters, the value of the filter parameters (e.g. $\alpha$, $\beta$, $\gamma$, and $\psi$ respectively for a four filter configuration) are determined by the placement of the poles and zeros in the Z-plane. Each simple exponential filter has an associated pole and a zero. The value of the pole is the difference between unity and the value of the filter parameter, for example the pole of the IIR filter 108 represented in Equation 2 is equal to $1-\alpha$.

A transfer function $H(z)$, resulting from the convolution of those of the simple exponential filters, is used to effect a frequency domain analysis yielding the amplitude (or modulus) of $H(i\omega)$, variation in the phase, and the group delay as a function of frequency. The profile of the amplitude of $H(i\omega)$ as a function of frequency is an indicator of the quality of filtering of the resistance.

$$H(z) = \frac{R_f(z)}{R_{raw}(z)} = \frac{b_0 + b_1 z^{-\Delta t} + b_2 z^{-2\Delta t} + \ldots + b_{n-1} z^{-(n-1)*\Delta t} + b_n z^{-n*\Delta t}}{a_0 + a_1 z^{-\Delta t} + a_2 z^{-2\Delta t} + \ldots + a_{m-1} z^{-(m-1)*\Delta t} + a_m z^{-m*\Delta t}} \quad \text{EQ 3}$$

The determination of the filter parameters is based on the frequency and time domain performances (in response to step and impulse functions) desired according to imposed criteria. This approach allows the smoothed resistance to be generated, according to desired frequency and time domain performance characteristics, by adjusting the values of the filter parameters used.

In order to fulfill the imposed criteria for the cascade of digital filters, the following conditions must be evaluated and met.

Condition 1: The group delay (delay of the filter response) must be within predetermined performance characteristics.

Condition 2: The stabilization time or settling time must be within predetermined performance characteristics to take into account anode beam moves and other similar cell signal perturbations.

Condition 3: The smoothing quality of the resistance indicator (i.e. the output of the cascade of digital filters) must be within predetermined performance characteristics (e.g. the magnitude of the passband and stopband in the frequency response and the width of the transition band) to ensure removal of the unwanted noise.

Condition 4: The results of testing of the digital filters using simulations with signals sampled from cells (in extreme and normal conditions) must be within predetermined performance characteristics.

Figure 2:
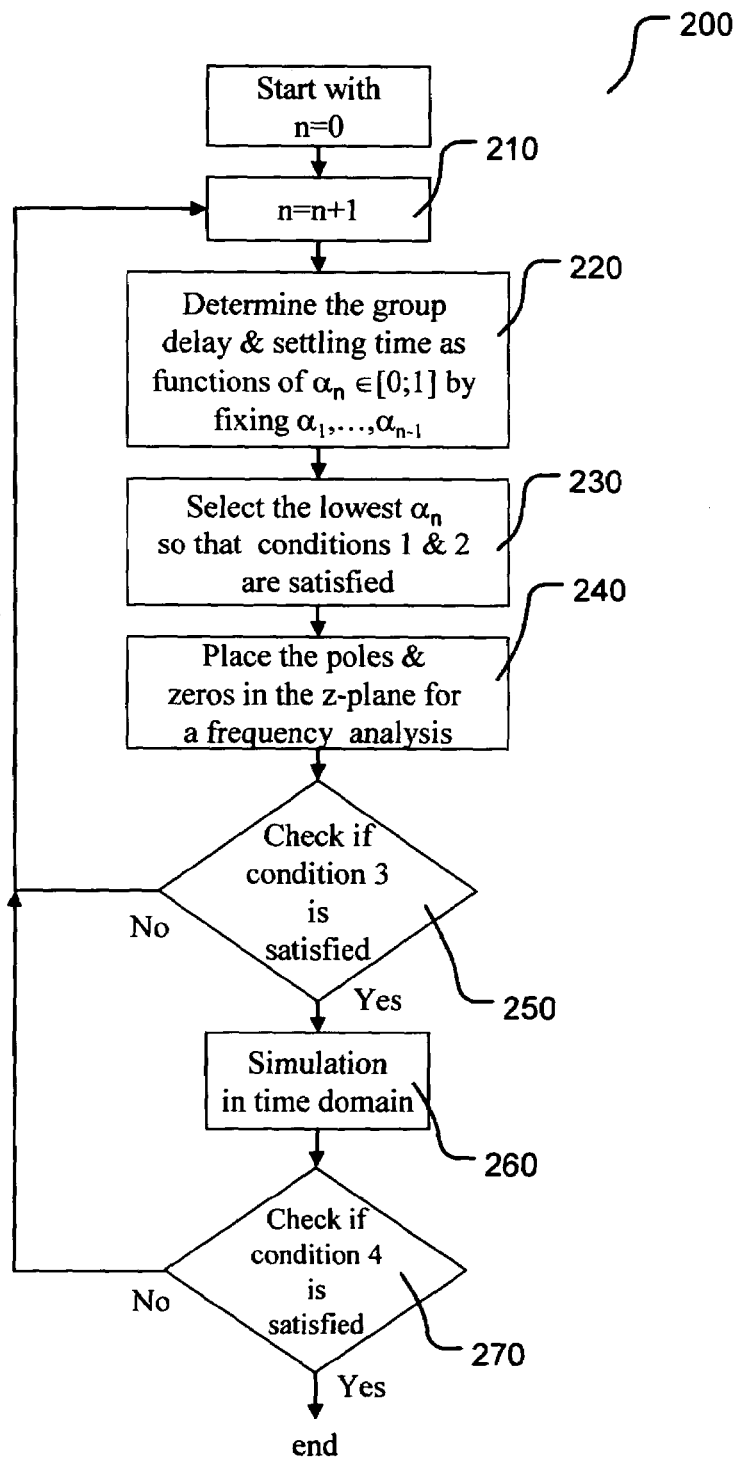
FIG. 2 is a flow diagram representing the steps in an exemplary method for designing a cascade of digital filters for use in the control of an electrolytic reduction cell according to the present invention.

FIG. 2 is a flow diagram representing the steps in an exemplary method 200 for designing a cascade of digital filters for use in controlling an electrolytic reduction cell according to the present invention.

The method begins in step 210 with a filter order 'n' set to indicate that the number of digital filters in the cascade is 1 (i.e. filter order=1). In step 220, the group delay and stabilization or settling time for different values of the filter parameter a for each of the 'n' digital filters are determined. From EQ 2, it is possible to determine the group delay and stabilization (or settling) time for different values of the filter parameter $\alpha$ (e.g. $0 < \alpha \leq 1$) using a given sampling time $\Delta t$. Graph 1 shows the group delay and stabilization time of a single exponential smoothing (n=1, filter order=1) as a function of values of filter parameter $\alpha$ using a given time interval $\Delta t$. A different sampling time will give a different group delay and stabilization time. The settling time is determined by applying a step change or impulse to the filter transfer function.

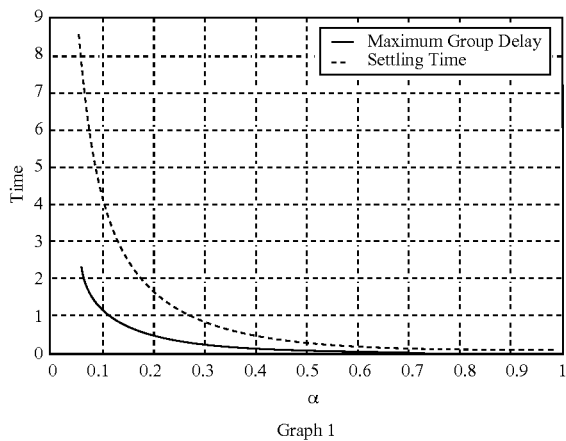

Graph 1

In step 230, the lowest value of α is selected so that conditions 1 and 2, described above, are satisfied. This minimum value of α will give the best data smoothing.

In step 240, a pole and zero for each of the 'n' digital filters is placed, in the z-plane, which according to EQ 2 are respectively equal to 1-α and zero, in order to perform a frequency analysis of the transfer function using the α values selected in step 230.

In step 250, a check is made to determine if condition 3 is satisfied by analyzing the magnitude response as a function of frequency (i.e. filter frequency response profile) based on the frequency analysis of step 240. Verification is made of the passband frequency (which should include a desire frequency with a magnitude close to 1), the transition band width and the stopband (which should include an unwanted frequency with magnitude close to zero).

If condition 3 is not satisfied, the filter order is increased by increasing the number of digital filters by one in step 210 and the method continues. If condition 3 is satisfied, then a simulation in the time domain 260 in carried out.

In step 260 the simulation is used to assess the performance, in the time domain, of the digital filters using the selected filter parameters (i.e. $\alpha_1, \ldots, \alpha_n$). Raw data signals sampled from different electrolytic reduction cells in different (e.g. extreme and normal) operating conditions are used in the simulation.

In step 270 a check is made to determine if, based on the assessment made in step 260, condition 4 is satisfied. If not, filter order is increased by increasing the number of digital filters by one in step 210 and the method continues. If condition 4 is satisfied, the digital filter parameters (i.e. $\alpha_1, \ldots, \alpha_n$) and the filter order 'n' can be used in the cascade of digital filters for use in controlling an electrolytic reduction cell.

A cascade of digital filters 106A designed according to the method 200 of the present invention can be used to control an electrolytic reduction cell 50. The cascade of digital filters 106A being used in the measurement of an electrical parameter representative of the alumina concentration in the electrolytic reduction cell 50. The electrical parameter can be, for example, a resistance trend indicator.

A process for the electrolytic reduction of alumina in a reduction cell 50, according to the present invention, comprises the step of: introducing alumina into an electrolyte 60 in the reduction cell 50; applying a current between an anode 56 and a cathode 54 in the reduction cell 50; measuring an electrical parameter representative of the alumina concentration in the reduction cell 50; filtering the measurements of the electrical parameters using a cascade of digital filters 160A; predicting the onset of an anode effect based on the filtered measurements of the electrical parameter; and adding additional alumina into the electrolyte 60 when the onset of an anode effect is predicted. The cascade of digital filters 160A having a filter order corresponding to the number of digital filters in the cascade and a specifying parameter for each digital filter determined in accordance with the method 200 of the present invention.

A system for controlling an electrolytic reduction cell 50 according to the present invention comprising: a mechanism 102 for measuring an electrical parameter representative of the alumina concentration in the reduction cell 50; a cascade of digital filters 106A for filtering the measurements of the electrical parameter; a mechanism for predicting the onset of an anode effect based on the filtered measurements of the electrical parameter; and a mechanism for adding alumina into the reduction cell 50 when the onset of an anode effect is predicted. The cascade of digital filters 160A having a filter order corresponding to the number of digital filters in the cascade and a specifying parameter for each digital filter determined in accordance with the method 200 of the present invention.

It will be apparent to one skilled in the art that numerous modifications and departures from the specific embodiments described herein may be made without departing from the spirit and scope of the present invention.

The invention claimed is:

1. A method for designing a cascade of digital filters for use in controlling an electrolytic reduction cell, the cascade having a filter order corresponding to a number of digital filters in the cascade and each digital filter having a specifying parameter, the method comprising the steps of:
   selecting a lowest value for the parameter for each digital filter such that each of a group delay and a settling time are within predetermined performance characteristics;
   determining if a smoothing quality of the cascade of digital filters is within predetermined performance characteristics;
   increasing the filter order by one when the smoothing quality is not within predetermined performance characteristics;
   determining if a result of a time domain analysis is within predetermined performance characteristics; and
   increasing the filter order by one when the result of the time domain analysis is not within predetermined performance characteristics;
   wherein the filter order and the parameters for each of the digital filters is used to specify the cascade of digital filters to be used in controlling the electrolytic reduction cell.

2. The method of claim 1, wherein the predetermined performance characteristic for the group delay specifies a group delay not greater than a predetermined value.

3. The method of claim 1, wherein the predetermined performance characteristic for the settling time specifies a settling time not greater than a predetermined value.

4. The method of claim 1, wherein the step of selecting a lowest value for the parameter for each digital filter is based on a group delay and a settling time as functions of parameter values.

5. The method of claim 1, wherein the step of determining if a smoothing quality of the cascade of digital filters is within predetermined performance characteristics is based on a frequency domain analysis.

6. The method of claim 5, wherein the frequency domain analysis is based on the convolution of transfer functions of the digital filters in the cascade.

7. The method of claim 1, wherein the predetermined performance characteristic for the smoothing quality specifies a passband frequency, a transition band width and a stopband frequency each in accordance with a predetermined value.

8. The method of claim 1, wherein the time domain analysis is based on data signals sampled from a plurality of electrolytic reduction cells.

9. A method for designing a cascade of digital filters for use in controlling an electrolytic reduction cell, the cascade having a filter order corresponding to a number of digital filters in the cascade and each digital filter having a specifying parameter, the method comprising the steps of:
 setting the filter order to one;
 determining a group delay and a settling time as functions of parameter values for a predetermined sampling time;
 selecting a lowest value for the parameter for each digital filter such that each of the group delay and the settling time are within predetermined performance characteristics based on the group delay and the settling time as functions of parameter values;
 performing a frequency domain analysis for the cascade of digital filters;
 determining if a smoothing quality of the cascade of digital filters is within predetermined performance characteristics based on the frequency domain analysis;
 increasing the filter order by one when the smoothing quality is not within predetermined performance characteristics;
 performing a time domain analysis for the cascade of digital filters;
 determining if a result of the time domain analysis is within predetermined performance characteristics; and
 increasing the filter order by one when the result of the time domain analysis is not within predetermined performance characteristics;
wherein the filter order and the parameters for each of the digital filters is used to specify the cascade of digital filters to be used in controlling the electrolytic reduction cell.

10. The method of claim 9, wherein the predetermined performance characteristic for the group delay specifies a group delay not greater than a predetermined value.

11. The method of claim 9, wherein the predetermined performance characteristic for the settling time specifies a settling time not greater than a predetermined value.

12. The method of claim 9, wherein the frequency domain analysis is based on the convolution of the transfer functions of the digital filters in the cascade.

13. The method of claim 9, wherein the predetermined performance characteristic for the smoothing quality specifies a passband frequency, a transition band width and a stopband frequency each in accordance with a predetermined value.

14. The method of claim 9, wherein the time domain analysis is based on data signals sampled from a plurality of electrolytic reduction cells.

15. Use of a cascade of digital filters designed according to the method of claim 1 to control an electrolytic reduction cell.

16. The use of claim 15 wherein the cascade of digital filters is used in the measurement of an electrical parameter representative of the alumina concentration in the electrolytic reduction cell.

17. The use of claim 16 wherein the electrical parameter is a resistance trend indicator.

18. A process for electrolytic reduction of alumina in a reduction cell, the process comprising the steps of:
 introducing alumina into an electrolyte contained in the reduction cell;
 applying an electric current between an anode and a cathode in the reduction cell;
 measuring an electrical parameter representative of the alumina concentration in the reduction cell;
 filtering measurements of the electrical parameter using a cascade of digital filters, the cascade having a filter order corresponding to a number of digital filters in the cascade and each digital filter having a specifying parameter, the filter order and the specifying parameters being determined by the steps of:
  selecting a lowest value for the parameter for each digital filter such that each of a group delay and a settling time are within predetermined performance characteristics;
  determining if a smoothing quality of the cascade of digital filters is within predetermined performance characteristics;
  increasing the filter order by one when the smoothing quality is not within predetermined performance characteristics;
  determining if a result of a time domain analysis is within predetermined performance characteristics; and
  increasing the filter order by one when the result of the time domain analysis is not within predetermined performance characteristics;
 predicting the onset of an anode effect based on filtered measurements of the electrical parameter; and
 adding additional alumina into the electrolyte when the onset of an anode effect is predicted.

19. A system for controlling an electrolytic reduction cell comprising:
 a mechanism for measuring an electrical parameter representative of an alumina concentration in the reduction cell;
 a cascade of digital filters for filtering measurements of the electrical parameter, the cascade having a filter order corresponding to a number of digital filters in the cascade and each digital filter having a specifying parameter, the filter order and the specifying parameters being determined by:
  selecting a lowest value for the parameter for each digital filter such that each of a group delay and a settling time are within predetermined performance characteristics;
  determining if a smoothing quality of the cascade of digital filters is within predetermined performance characteristics;
  increasing the filter order by one when the smoothing quality is not within predetermined performance characteristics;
  determining if a result of a time domain analysis is within predetermined performance characteristics; and
  increasing the filter order by one when the result of the time domain analysis is not within predetermined performance characteristics;
 a mechanism for predicting the onset of an anode effect based on filtered measurements of the electrical parameter; and
 a mechanism for adding alumina into the reduction cell when the onset of an anode effect is predicted.

* * * * *